United States Patent
Majmundar (10) Patent No.: US 9,898,262 B2
(45) Date of Patent: *Feb. 20, 2018

(54) USER INTERFACE EVENT ORCHESTRATION

(71) Applicant: JPMorgan Chase Bank, N.A., New York, NY (US)

(72) Inventor: Ashish Majmundar, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,905

(22) Filed: Jun. 27, 2017

(65) Prior Publication Data

US 2017/0293475 A1  Oct. 12, 2017

Related U.S. Application Data (63) Continuation of application No. 14/082,012, filed on Nov. 15, 2013, now Pat. No. 9,720,655.

(60) Provisional application No. 61/759,670, filed on Feb. 1, 2013.

(51) Int. Cl.
G06F 9/44 (2006.01)

(52) U.S. Cl.
CPC .................. *G06F 8/35* (2013.01); *G06F 8/31* (2013.01); *G06F 8/34* (2013.01)

(58) Field of Classification Search
CPC ........................................................ G06F 9/44
USPC .................... 717/114, 116, 117, 104, 105
See application file for complete search history.

(56) References Cited

U.S. PATENT DOCUMENTS

| | | | |
|---|---|---|---|
| 4,751,702 A | 6/1988 | Beier et al. |
| 5,027,269 A | 6/1991 | Grant et al. |
| 5,075,881 A | 12/1991 | Blomberg et al. |
| 5,313,616 A | 5/1994 | Cline et al. |
| 5,347,518 A | 9/1994 | Lee |
| 5,386,551 A | 1/1995 | Chikira et al. |
| 5,446,895 A | 8/1995 | White et al. |
| 5,539,885 A | 7/1996 | Ono et al. |
| 5,549,117 A | 8/1996 | Tacklind et al. |
| 5,563,998 A | 10/1996 | Yakish et al. |
| 5,566,297 A | 10/1996 | Devarakonda |

(Continued)

FOREIGN PATENT DOCUMENTS

WO    01/74043    10/2001

OTHER PUBLICATIONS

Alessandra Agostini et al, A light workflow management system using simple process models, Computer Supported Cooperative Work, pp. 335-363 (Nov. 2000).

(Continued)

*Primary Examiner* — Jae Jeon
(74) *Attorney, Agent, or Firm* — Hunton & Williams LLP (57) ABSTRACT

Methods, systems and computer program products for user interface event orchestration are provided. A computer-implemented method may include defining a business domain object, associating the business domain object with a user interface component type, defining a rule for an event of the user interface component type, generating an event handling routine providing the defined rule in a programming language, and associating the generated event handling routine with a user interface component of an application interface.

15 Claims, 3 Drawing Sheets

(56) References Cited

U.S. PATENT DOCUMENTS

| | | |
|---|---|---|
| 5,594,863 A | 1/1997 | Stiles |
| 5,630,047 A | 5/1997 | Wang |
| 5,630,069 A | 5/1997 | Flores et al. |
| 5,655,074 A | 8/1997 | Rauscher |
| 5,701,471 A | 12/1997 | Subramanyam |
| 5,712,971 A | 1/1998 | Stanfill et al. |
| 5,721,913 A | 2/1998 | Ackroff et al. |
| 5,721,914 A | 2/1998 | De Vries |
| 5,748,878 A | 5/1998 | Rees et al. |
| 5,752,034 A | 5/1998 | Srivastava |
| 5,758,061 A | 5/1998 | Plum |
| 5,768,506 A | 6/1998 | Randell |
| 5,781,448 A | 7/1998 | Nakamura et al. |
| 5,784,562 A | 7/1998 | Diener |
| 5,799,297 A | 8/1998 | Goodridge et al. |
| 5,806,075 A | 9/1998 | Jain et al. |
| 5,828,883 A | 10/1998 | Hall |
| 5,835,770 A | 11/1998 | Shum et al. |
| 5,842,196 A | 11/1998 | Agarwal et al. |
| 5,845,292 A | 12/1998 | Bohannon et al. |
| 5,872,976 A | 2/1999 | Yee et al. |
| 5,884,037 A | 3/1999 | Aras et al. |
| 5,903,721 A | 5/1999 | Sixtus |
| 5,903,897 A | 5/1999 | Carrier, III et al. |
| 5,920,719 A | 7/1999 | Sutton et al. |
| 5,937,198 A | 8/1999 | Nelson et al. |
| 5,960,196 A | 9/1999 | Carrier, III et al. |
| 5,960,445 A | 9/1999 | Tamori et al. |
| 5,995,965 A | 11/1999 | Experton |
| 6,003,075 A | 12/1999 | Arendt et al. |
| 6,009,274 A | 12/1999 | Fletcher et al. |
| 6,026,237 A | 2/2000 | Berry et al. |
| 6,028,938 A | 2/2000 | Malkin et al. |
| 6,029,002 A | 2/2000 | Afifi et al. |
| 6,058,393 A | 5/2000 | Meier et al. |
| 6,061,503 A | 5/2000 | Chamberlain |
| 6,061,686 A | 5/2000 | Gauvin et al. |
| 6,067,412 A | 5/2000 | Blake et al. |
| 6,073,107 A | 6/2000 | Minkiewicz et al. |
| 6,088,700 A | 7/2000 | Larsen et al. |
| 6,101,601 A | 8/2000 | Matthews et al. |
| 6,108,673 A | 8/2000 | Brandt et al. |
| 6,125,390 A | 9/2000 | Touboul |
| 6,128,708 A | 10/2000 | Fitzpatrick et al. |
| 6,138,112 A | 10/2000 | Slutz |
| 6,145,121 A | 11/2000 | Levy et al. |
| 6,167,534 A | 12/2000 | Straathof et al. |
| 6,175,833 B1 | 1/2001 | West et al. |
| 6,195,676 B1 | 2/2001 | Spix et al. |
| 6,230,319 B1 | 5/2001 | Britt, Jr. et al. |
| 6,237,035 B1 | 5/2001 | Himmel et al. |
| 6,237,143 B1 | 5/2001 | Fontana et al. |
| 6,243,862 B1 | 6/2001 | Lebow |
| 6,247,029 B1 | 6/2001 | Kelley et al. |
| 6,249,877 B1 | 6/2001 | Kawakami et al. |
| 6,269,479 B1 | 7/2001 | Puram |
| 6,279,039 B1 | 8/2001 | Bhat et al. |
| 6,301,701 B1 | 10/2001 | Walker et al. |
| 6,311,327 B1 | 10/2001 | O'Brien et al. |
| 6,363,499 B1 | 3/2002 | Delo et al. |
| 6,363,524 B1 | 3/2002 | Loy |
| 6,405,250 B1 | 6/2002 | Lin et al. |
| 6,405,364 B1 | 6/2002 | Bowman-Amuah |
| 6,411,910 B1 | 6/2002 | Eulau et al. |
| 6,424,981 B1 | 7/2002 | Isaac et al. |
| 6,438,749 B1 | 8/2002 | Chamberlain |
| 6,446,126 B1 | 9/2002 | Huang et al. |
| 6,463,454 B1 | 10/2002 | Lumelsky et al. |
| 6,466,980 B1 | 10/2002 | Lumelsky et al. |
| 6,467,052 B1 | 10/2002 | Kaler et al. |
| 6,470,464 B2 | 10/2002 | Bertram et al. |
| 6,477,471 B1 | 11/2002 | Hedstrom et al. |
| 6,502,207 B1 | 12/2002 | Itoh et al. |
| 6,505,176 B2 | 1/2003 | DeFrancesco, Jr. et al. |
| 6,513,154 B1 | 1/2003 | Porterfield |
| 6,519,763 B1 | 2/2003 | Kaufer et al. |
| 6,526,443 B1 | 2/2003 | Goldsmith et al. |
| 6,546,506 B1 | 4/2003 | Lewis |
| 6,560,580 B1 | 5/2003 | Fraser et al. |
| 6,578,004 B1 | 6/2003 | Cimral et al. |
| 6,578,006 B1 | 6/2003 | Saito et al. |
| 6,584,447 B1 | 6/2003 | Fox et al. |
| 6,587,841 B1 | 7/2003 | DeFrancesco, Jr. et al. |
| 6,601,017 B1 | 7/2003 | Kennedy et al. |
| 6,601,018 B1 | 7/2003 | Logan |
| 6,601,233 B1 | 7/2003 | Underwood |
| 6,626,953 B2 | 9/2003 | Johndrew et al. |
| 6,629,266 B1 | 9/2003 | Harper et al. |
| 6,820,088 B1 | 11/2004 | Hind et al. |
| 6,826,745 B2 | 11/2004 | Coker et al. |
| 6,920,467 B1 | 7/2005 | Yoshimoto |
| 6,934,934 B1 | 8/2005 | Osborne, II et al. |
| 7,681,176 B2 * | 3/2010 | Wills ..................... G06F 8/34 |
| | | 717/104 |
| 2002/0004912 A1 | 1/2002 | Fung |
| 2002/0133593 A1 | 9/2002 | Johnson et al. |
| 2002/0133757 A1 | 9/2002 | Bertram et al. |
| 2002/0138571 A1 | 9/2002 | Trinon et al. |
| 2002/0143929 A1 | 10/2002 | Maltz et al. |
| 2002/0147961 A1 | 10/2002 | Charters et al. |
| 2002/0162090 A1 | 10/2002 | Parnell et al. |
| 2002/0165754 A1 | 11/2002 | Tang et al. |
| 2003/0004848 A1 | 1/2003 | Hellerstein et al. |
| 2003/0018952 A1 | 1/2003 | Roetzheim |
| 2003/0033586 A1 | 2/2003 | Lawler |
| 2003/0041000 A1 | 2/2003 | Zajac et al. |
| 2003/0065644 A1 | 4/2003 | Horman et al. |
| 2003/0120539 A1 | 6/2003 | Korium et al. |
| 2003/0144868 A1 | 7/2003 | MacIntyre et al. |
| 2003/0188290 A1 | 10/2003 | Corral |
| 2003/0196190 A1 | 10/2003 | Ruffalo et al. |
| 2003/0212518 A1 | 11/2003 | De'Allessandro et al. |
| 2003/0225662 A1 | 12/2003 | Horan et al. |
| 2003/0225663 A1 | 12/2003 | Horan et al. |
| 2004/0001092 A1 * | 1/2004 | Rothwein ............... G06F 8/38 |
| | | 715/763 |
| 2005/0071807 A1 | 3/2005 | Yanai |
| 2009/0287617 A1 * | 11/2009 | Schmidt ............... G06Q 10/06 |
| | | 706/10 |
| 2011/0321020 A1 * | 12/2011 | McCabe ................ G06F 8/41 |
| | | 717/144 |

OTHER PUBLICATIONS

Betwixt: Turning beans into XML, http://web.archive.org/web/20020620000410/http://jakarta.apache.org/commons/betwixt (last visited Nov. 13, 2005).

Claes Wohlin et al, Understanding the Sources of Software Defects: A Filtering Approach (Abstract), 8th Int'l Workshop on Program Comprehension, p. 9 (2000).

CSK Software AG, Business Process Automation and Workflow in the Financial Industry (2003).

D.M. Hilbert et al, An approach to large-scale collection of application usage data over the internet (Abstract), Proc. Int'l Conf. Software Engineering, pp. 136-145 (1998).

David S. Lindsay, Software Evaluation, Tests, and Measurements (Abstract), in ACM Computing Rev. (J.E. Sammet, ed.), p. 519 (1981).

Dimitrious Georgakopoulos et al, An Overview of Workflow Management: From Process Modeling to Workflow Automation Infrastructure, Distributed and Parallel Databases, pp. 119-153 (1995).

Drake E. Lundell Jr. et al, Computer Use—an executive's guide (Abstract), in ACM Computing Rev. (M.A. Duggan, ed.), pp. 48-49 (1974).

Esmond Pitt et al, java.rmi: The Remove Method Invocation Guide, Section 3.5 (2001).

ExoLab Group, Using Castor XML, http://web.archive.org/web/20010827042213/http://www.castor.org/xml_framework.html (last visited Nov. 11, 2005).

Graham Hamilton, ed., Sun Microsystems JavaBeans API Specification, pp. 54-82 (1997).

(56) References Cited

OTHER PUBLICATIONS

IBM Corporation, Code Generation for Database Applications, IBM Tech. Disclosure Bulletin Mar. 1992 (Mar. 1992).

IBM Corporation, OS/2 EE Database Manager SQLJRA Remote Protocol, IBM Tech. Disclosure Bulletin Jan. 1993, pp. 33-36 (Apr. 1993).

J.P. Hudepohl et al, Integrating metrics and models for software risk assessment (Abstract), 7th Int'l Conf. Software Reliability Engineering, p. 93 (1996).

Len Reinhart, Liability management: A new tool for financial consultants, Financial Consultant (Fall/Winter 1996).

Mary Campione et al, Java Tutorial: A Short Course on the Basics, Ch. 5 (3d ed. 2000).

Norman E. Fenton et al, A Critique of Software Defect Prediction Models, IEEE Transactions Software Engineering, pp. 675-689 (Sep./Oct. 1999).

S.G. Linkman, Quantitative monitoring of software development by time-based and intercheckpoint monitoring (Abstract), Software Engineering J., pp. 43-49 (Jan. 1990).

Sanjay Mohapatra et al, Defect Prevention through Defect Prediction: A Case Study at Infosys (Abstract), IEEE Int'l Conf. Software Maintenance, p. 260 (2001).

Steve McConnell, Gauging Software Readiness with Defect Tracking, IEEE Software (May/Jun. 1997).

Sybase Inc., Monitor Client Library 12.5 Progammer's Guide (May 2001).

Tze-Jie Yu et al, An Analysis of Several Software Defect Models, IEEE Transactions Software Engineering, pp. 1261-1270 (Sep. 1988).

V. Basili et al, Understanding and predicting the process of software maintenance releases (Abstract), 18th Int'l Conf. Software Engineering, p. 464 (1996).

Ytzhak Levendel, Reliability Anlaysis of Large Software Systems: Defect Data Modeling, IEEE Transactions Software Engineering, pp. 141-152 (Feb. 1990).

\* cited by examiner

USER INTERFACE EVENT ORCHESTRATION

CROSS-REFERENCE TO RELATED APPLICATIONS

This application is a continuation application of U.S. patent application Ser. No. 14/082,012 filed on Nov. 15, 2013, which claims priority to Provisional Application Ser. No. 61/759,670, filed on Feb. 1, 2013, both of which are hereby incorporated in their entirety.

TECHNICAL FIELD

The field generally relates to software and, more specifically, to software application development.

BACKGROUND

Many software applications utilize multiple data sources, interdependent components, conditional business logic, and validation requiring custom coding. However, custom code is often embedded within graphical user interface components and cannot be reused across other applications and platforms. As a result, applications become increasingly complex and costly to maintain over time as business rules change.

Accordingly, there is a need for improvements to the organization and utilization of custom code in order to reduce the time and expense associated with building and maintaining software applications.

SUMMARY

Embodiments generally relate to user interface event orchestration. In one embodiment, a computer system defines a business domain object from a line of business, and associates the business domain object with a user interface component type. A rule is defined for an event of the user interface component type based on the associated business domain object. An event handling routine is then generated to provide the defined rule in a programming language. The generated event handling routine is then associated with a user interface component of an application interface.

In another embodiment, a system includes a memory and a processor coupled to the memory to provide user interface event orchestration. The system defines a business domain object from a line of business, and associates the business domain object with a user interface component type. The system then defines a rule for an event of the user interface component type based on the associated business domain object and generates an event handling routine to provide the defined rule in a programming language. The system then associates the event handling routine with a user interface component of an application interface.

In a further embodiment, a computer-readable medium has instructions that, when executed by a processor, cause the processor to perform operations. The instructions include computer-readable program code configured to cause the processor to define a business domain object from a line of business, associate the business domain object with a user interface component type, define a rule for an event of the user interface component type based on the associated business domain object, generate an event handling routine to provide the defined rule in a programming language, and associate the generated event handling routine with a user interface component of an application interface.

Further embodiments, features, and advantages of the invention, as well as the structure and operation of the various embodiments of the invention are described in detail below with reference to accompanying drawings.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

In the following description, numerous details are set forth. It will be apparent, however, to one skilled in the art having the benefit of this disclosure, that the present invention may be practiced without these specific details. In some instances, well-known structures and devices are shown in block diagram form, rather than in detail, in order to avoid obscuring the present invention.

Some portions of the detailed descriptions may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "defining", "determining", "associating", "providing", "generating", "transmitting", "utilizing", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention may also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays that may be presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the following description. In addition, the present invention is not described with reference to any particular programming language. It will be appreciated that a variety of programming languages may be used to implement the teachings of the invention as described herein.

Graphical user interfaces (GUIs) allow users to interact with software applications delivered on computing devices. Many software applications are tailored to support business operations and include large amounts of custom business logic. However, custom business logic is often dispersed throughout multiple layers of a software application. For example, custom business logic is often intermingled with computer code used to provide a graphical user interface to users. Further, much of the custom business logic is duplicated in multiple locations within an application and across other numerous applications throughout an enterprise. Thus, it becomes very costly and time consuming to enhance and maintain software applications over time as business rules and processes continually change.

Methods, systems and computer program products for user interface event orchestration, are described. Embodiments of the present invention are directed to automated generation of reusable user interface event handling routines from a set of business and/or design requirement artifacts. More specifically, a layer of event handling routines with business logic may be generated and exist independently from user interface components. Multiple application user interfaces then may utilize the generated routines as a common set of event handling services. Further, since the event handling routines are provided apart from any user interface presentation code, business rule modification may occur without updating user interface code in one or more software applications.

Figure 1:
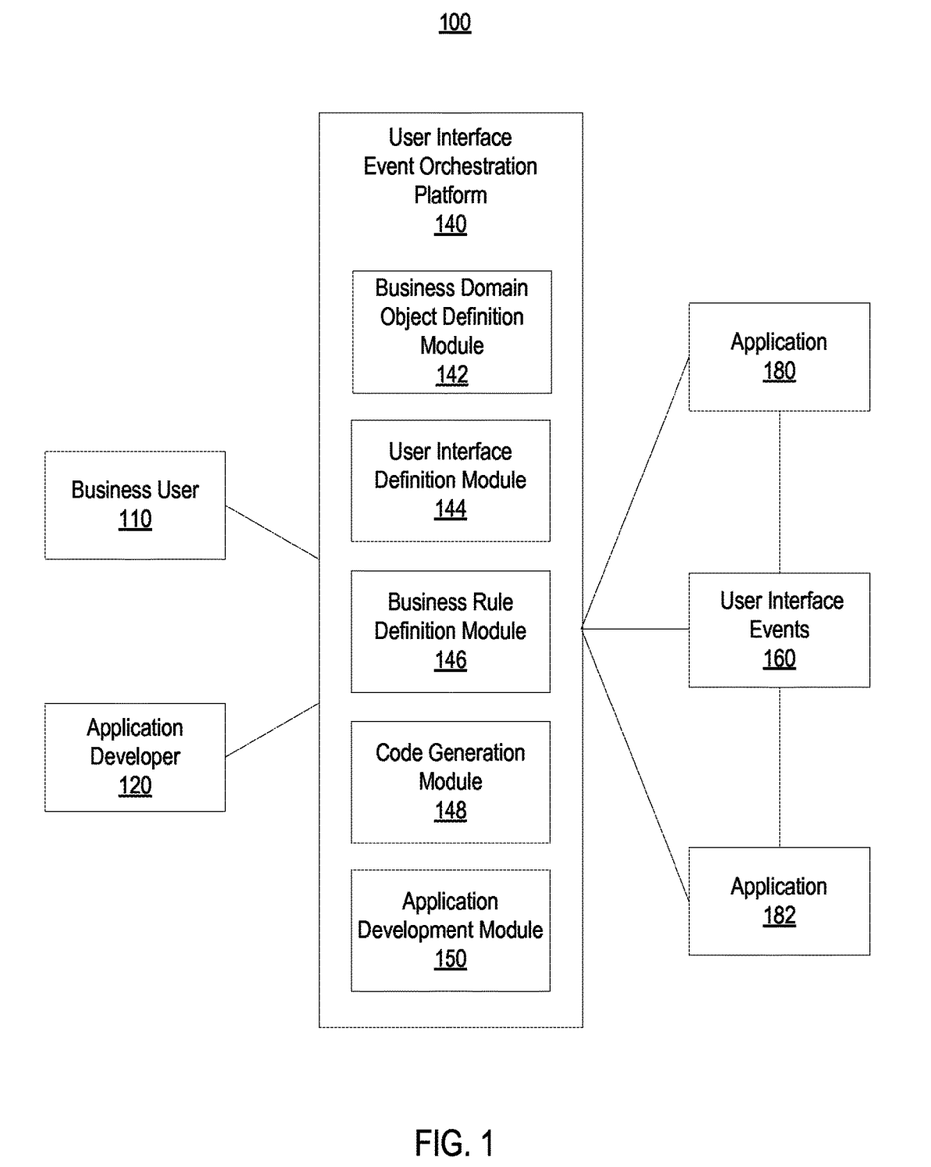
FIG. 1 illustrates a system block diagram of a user interface event orchestration platform, in accordance with various embodiments of the present invention.

FIG. 1 illustrates a block diagram of a system 100, in accordance with various embodiments of the present invention. The system 100 may be comprised of a business user 110, an application developer 120, an application development environment represented by a user interface event orchestration platform 140, user interface events 160, and applications 180, 182.

The system 100 may be comprised of one or more computer systems connected to a network. The network may be, for example, a public network (e.g., the Internet), a private network (e.g., a local area network (LAN) or wide area network (WAN)), or a combination thereof. The computer systems may include personal computers (PC), laptops, mobile phones, tablet computers, or any other computing device. The computer systems may run an operating system (OS) that manages hardware and software. The computer systems also may include one or more server machines. A server machine may be a rackmount server, a router computer, a personal computer, a portable digital assistant, a mobile phone, a laptop computer, a tablet computer, a camera, a video camera, a netbook, a desktop computer, a media center, or any combination thereof.

Business user 110 is a person with knowledge of how a business and/or industry operates. Business user 110 may include a business analyst or any such individual who gathers functional requirements and business requirements for a software application. Application developer 120 is a person who designs, programs, tests, and/or integrates software applications. In some embodiments, business user 110 and application developer 120 utilize user interface event orchestration platform 140 to create user interface events 160 and software applications 180, 182 that leverage the user interface events 160.

Event orchestration platform 140 may be comprised of a business domain object definition module 142, a user interface definition module 144, a business rule definition module 146, a code generation module 148, and an application development module 150. In one embodiment, event orchestration platform 140 is provided as part of an integrated development environment (IDE) for developing software applications. In another embodiment, event orchestration platform 140 is provided as one or more tools, add-ons, and/or external applications that interact with and/or exchange information with an integrated development environment (IDE).

Business domain object definition module 142 allows definition of business domain objects, which may be, for example, entities, processes, and/or concepts associated with a business. In an embodiment, business domain object definition module 142 allows business domain objects to be defined visually as part of a graphical model and/or textually as part of a business domain object definition. In one example, business domain object definition module 142 allows definition of business domain object attributes and behavior.

User interface definition module 144 allows the conceptual design of graphical user interface screens. For example, a user interface definition module 144 may provide a non-technical user with the ability to add and organize user interface components to model a screen design. In one example, a visual modeling tool is used to create a sample user interface screen design. In another example, an integrated development environment (IDE) is used to design a nonfunctional user interface screen. In one embodiment, user interface definition module 144 allows user interface components from a sample screen design to be associated with defined business domain objects, as well as attributes and behavior of defined business domain objects.

Business rule definition module 146 allows business rules to be defined and associated with events of user interface components associated with one or more business domain objects. In an embodiment, business rule definition module 146 generates a spreadsheet-like interface based on a set of user interface components associated with business domain objects (e.g., from a nonfunctional user interface screen design).

In one example, business rule definition module 146 generates a spreadsheet that includes columns to allow a user to identify a source user interface component, a source user interface component event, rules and conditions, a target user interface component, a target action, parameters for a target action, and comments. One or more of the columns may contain pre-populated information to assist the user in selecting various data, such as a source user interface component. For example, business rule definition module 146 may provide pre-populated drop-down combo boxes that include information extracted from a nonfunctional user interface screen design.

Code generation module 148 analyzes defined business rules received from business rule definition module 146 to generate an event handling routine in a target computer programming language that implements the defined rule. In one embodiment, code generation module 148 receives a spreadsheet that includes business rules defined for user interface component events. Code generation module 148 then analyzes the business rules and other information in the spreadsheet and generates corresponding event handling routine in a target programming language based on the information.

Application development module 150 is a software application for designing and developing computer programs. In one example, application development module 150 is included in an integrated development environment (IRE) and is used by an application developer 120 to write and compile software applications. In another example, application development module 150 is used to associate user interface components in software applications with generated event handling routines. For example, user interface components of a software application may be designed to reference, call, and/or access the generated event handling routines instead of embedding/duplicating the generated event handling routines throughout a software application user interface.

User interface events 160 are generated event handling routines that provide custom business logic for a user interface component event. In an example, user interface events 160 are generated in one or more programming languages to provide a reference implementation for each of the programming languages. User interface events 160 may be defined for events including, but not limited to, "select", "input". "change", "search", "click", etc. In another example, user interface events 160 may be packaged with a software application as a library, exposed as an application programming interface (API), and/or provided as a set of services in a service oriented architecture (SOA).

Applications 180 and 182 are software applications with user interfaces that generate user events. In one example, the user interface components of applications 180 and 182 are associated with one or more user interface events 160 that have been generated from a defined set of business rules. The applications 180, 182 reference the user interface events 160, which may be internal or external to each of the applications 180, 182. The applications 180, 182 then utilize the user interface events 160 when corresponding user interface events are detected in the applications 180, 182.

Figure 2:
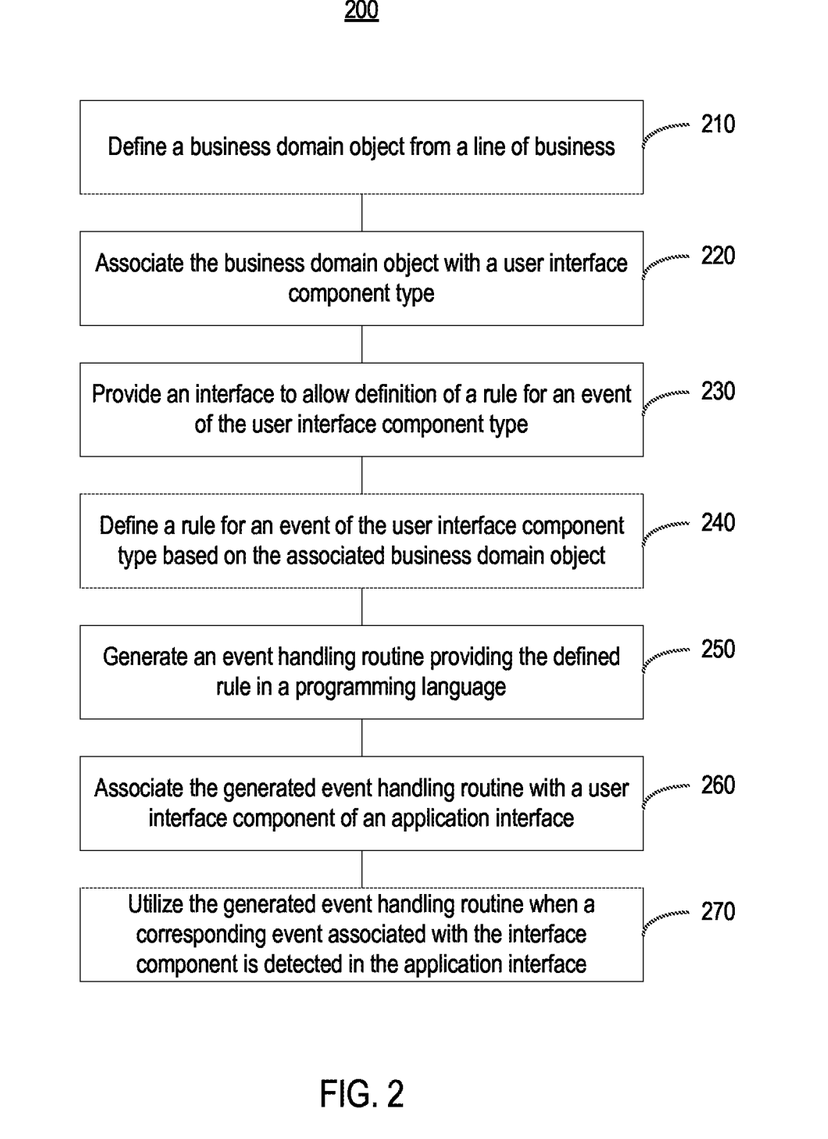
FIG. 2 is a process flow diagram illustrating a method of user interface event orchestration, according to an embodiment of the present invention.

FIG. 2 is a process flow diagram illustrating a method 200 for user interface event orchestration, according to an embodiment of the present invention. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 200 is performed using user interface event orchestration platform 140 of FIG. 1.

At stage 210, a business domain object from a line of business may be defined. In one embodiment, stage 210 is performed by business domain object definition module 142. A business domain object representing an entity or process associated with a business function may first be created. A business domain object may represent an entity such as an employee, a business unit, a customer, an account type, a transaction type, a transaction, a location, a product, a market, or any conceivable actor, instrument, process, or concept. Further, a business domain object may be defined as having attributes and behavior.

A business domain object may be defined using a standardized general-purpose modeling language such as the Unified Modeling Language (UML). A business domain object also may be defined using any form of graphical notation which may include, for example, a use case diagram, an object model diagram, an entity relationship diagram, a logical or physical database design diagram, or any other form of conceptual modeling. A business domain object also may be defined textually, for example, in an extensible format using a standard or specialized form of extensible markup language (XML), using any business process notation, or in software code, for example, as an object.

At stage 220, a defined business domain object may be associated with a user interface component type. In one embodiment, stage 220 is performed by user interface definition module 144. A graphical representation of a user interface may first be created. For example, a business analyst may use a modeling tool to create a screen mockup or wireframe to model a proposed user interface screen in a software application. In another example, a business analyst may use an integrated development environment (IDE) to model a user interface that will be later enhanced by a software application developer. In some examples, the graphical representation of the user interface is a nonfunctional design of a graphical user interface.

In an embodiment, enhanced graphical user interface controls provided in the IDE may be used to create the graphical representation of the user interface. Each of the enhanced graphical user interface controls may include custom properties to allow each control to be associated with one or more business domain objects. For example, the graphical representation of a user interface may include a text field to provide a social security number (SSN). The SSN text field may be associated with a "Person" domain object and a "social security number" attribute of the "Person" domain object. In another example, an enhanced graphical user interface table control may be associated with a "Dependents" domain object and four attributes of the domain object (LastName, FirstName, Relationship and Age). In some examples, the enhanced graphical user interface controls are associated with domain objects to facilitate the definition of business rules for user interface events.

At stage 230, an interface may be provided to allow the definition of a rule for a user interface component type. In one embodiment, stage 230 is performed by user interface definition module 144. An integrated development environment (IDE) may receive a graphical representation of a user interface containing one or more enhanced graphical user interface controls associated with a domain object. The IDE analyzes the graphical representation of the user interface and the associations between enhanced controls and domain objects to generate the interface. The IDE may generate a spreadsheet-like rules table with pre-populated drop-down combo boxes to facilitate the capturing and definition of business rules associated with graphical user interface components.

For example, a rule definition spreadsheet may be generated from one or more user interface screens of a software application. To facilitate rule definition the spreadsheet may contain columns, such as source component, source event, condition/rule, target component, and target action. The columns within the spreadsheet may also contain information in drop-down fields to assist in rule definition. For example, fields in a source component column may contain drop-down combo boxes containing the name of each user interface component associated with a particular user interface screen. Further, once a user interface component has been selected in the source component column, a collection of events that are associated with the source component type can be pre-populated in a drop-down combo box in a corresponding source event field.

In one embodiment, a single spreadsheet is provided for each specific screen or graphical user interface representation associated with a software application. In another embodiment, a single spreadsheet may separate rule definition for each specific screen or graphical user interface representation by placing each in a separate worksheet of the same spreadsheet. For example, each screen may be organized in a separate worksheet to facilitate the rule definition process by keeping the total number of components and events presented at one time to a reasonable number.

At stage 240, a rule is defined for an event of the user interface component type based on the associated business domain object. In one embodiment, stage 240 is performed by business rule definition module 146. A user (e.g., a business analyst) may enhance a generated spreadsheet identifying user interface screen components and related events. The user may specific rules to apply and/or actions to take when particular events are generated and/or detected. Further, the spreadsheet may contain multiple rows for the same user interface component and/or event to allow definition of multiple actions, rules, and interactions (i.e., complex user interface orchestration).

Rules and/or actions may be defined for a generic event that can be associated with one or more user interface component types. For example, rules or actions may be defined for an "on_change" event, which may be associated with one or more different user interface component types. Rules and/or actions also may be defined for an event of a user interface component that is associated with one or more specific business domain objects. For example, an "on_change" event may be defined for user interface components associated with one or more defined business objects.

At stage 250, an event handling routine is generated to provide a defined rule in a programming language. In one embodiment, stage 250 is performed by code generation module 148. The generated event handling routine may be based on a rule for an event of a user interface component type defined in stage 240. An event handling routine may be generated in more than one programming language to provide multiple reference implementations of the same event handling routine across different, non-compatible platforms and/or programming languages. In an embodiment, rules and actions defined for events associated with user interface components and user interface component types are received. For example a spreadsheet including defined rules and actions associated with events may be received and analyzed to generate one or more event handling routines in a specific programming language.

Generated event handling routines may be general, meaning they are not specifically associated with any particular user interface component type. Instead, one or more of the generated event handling routines provide event handling functionality that may be referenced, accessed, and utilize by one or more corresponding user interface components that are capable of realizing such an event (e.g., "on_change"). For example, an event handling routine containing rules and actions associated with a domain attribute, such as a person's Social Security number, may be generated and used/reused by multiple corresponding user interface components. The generated event handling routines may provide event handling functionality to corresponding user interface components from one or more different software applications.

At stage 260, the generated event handling routine may be associated with a user interface component of an application interface. In one embodiment, stage 260 is performed by application development module 150. Generated event handling routines are associated with graphical user interface components in a software application. For example, an instance of a user interface component in a software application may be associated with the generated event handling routine. A software developer may implement the event handling routine as an interface in an object oriented programming language such as Java. In another example, a user interface component may be associated with a generated event handling routine using a programmatic reference or programmatic call.

At stage 270, the generated event handling routine may be utilized when a corresponding event associated with the interface component is detected in the application interface. A software application with a graphical user interface includes one or more user interface components that are associated with generated event handling routines. For example, the software application is deployed and presented to a user on a computing device. The user generates an event associated with a user interface component referencing a generated event handling routine. The referenced generated event handling routine is then used when responding to the event.

A defined rule that has been generated in a programming language may be updated and regenerated to create a new, updated rule. The updated rule then may be used to generate an updated event handling routine to replace a previously defined event handling routine. In some embodiments, a new updated rule/routine may be deployed in place of an existing rule/routine, which may not require any modification to user interface components associated with the previously defined rule/routine.

Figure 3:
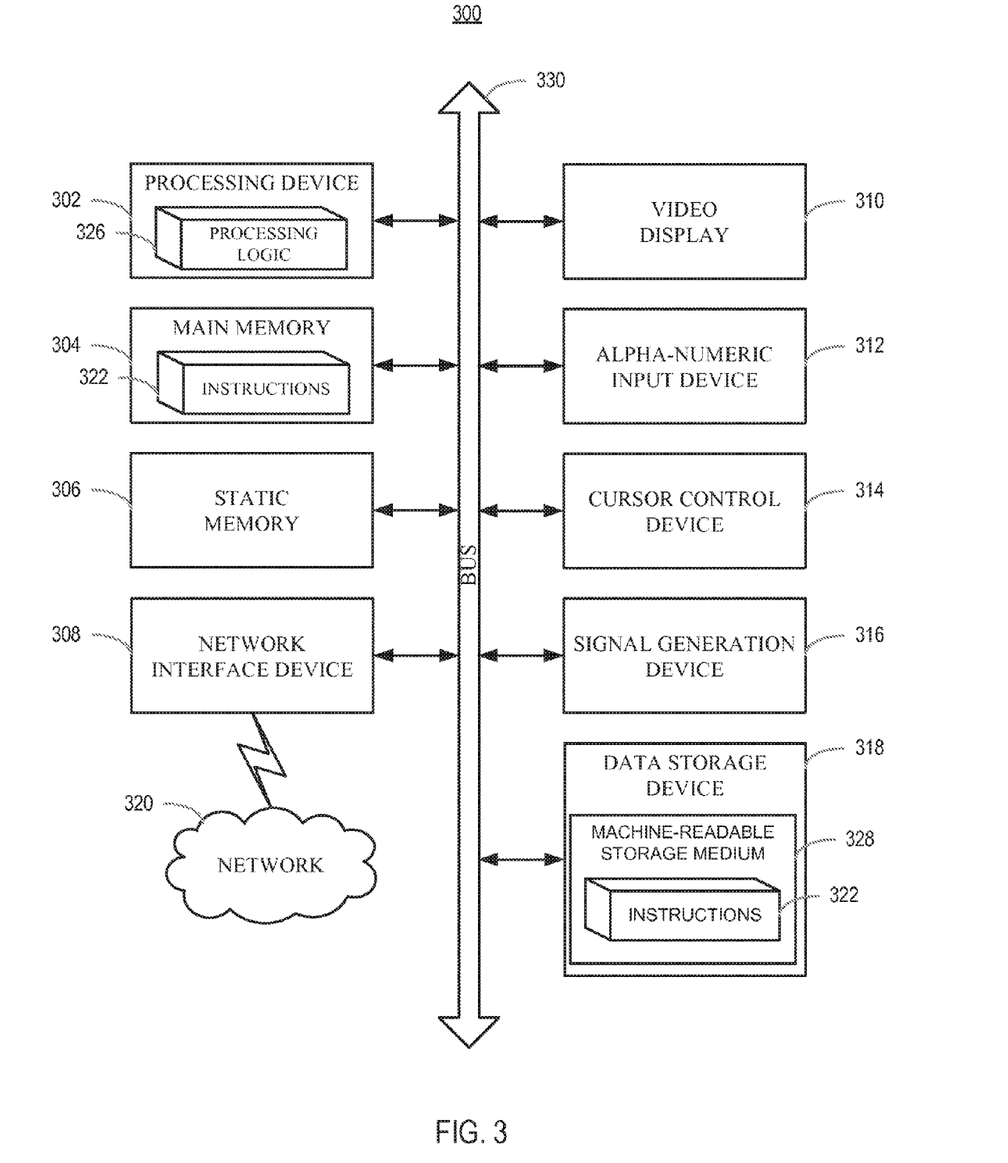
FIG. 3 is a block diagram of an exemplary computer system that may perform one or more of the operations described herein.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device (processor) 302, a main memory 304 (e.g., read-only memory (ROM), flash memory, dynamic random access memory (DRAM) such as synchronous DRAM (SDRAM), double data rate (DDR SDRAM), or DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, central processing unit, or the like. More particularly, the processor device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute processing logic 326 for performing the operations and steps discussed herein.

Computer system 300 may further include a network interface device 308. Computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

Data storage device 318 may include a machine-readable storage medium (or more specifically a computer-readable storage medium) 328 on which is stored one or more sets of instructions 322 (e.g., software) embodying any one or more of the methodologies or functions described herein. For example, data storage device 318 may store instructions for a user interface event orchestration system (e.g., user interface event orchestration system 100 of FIG. 1) and/or a software library containing methods that call a user interface orchestration module. Instructions 322 may also reside, completely or at least partially, within main memory 304 and/or within the processing device 302 during execution thereof by computer system 300, main memory 304 and the processor 302 also constituting computer-readable storage media. Instructions 322 may further be transmitted or received over a network 320 via network interface device 308.

While machine-readable storage medium 328 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

It is to be understood that the foregoing description is intended to be illustrative, and not restrictive. Many other embodiments will be apparent to those of skill in the art upon reading and understanding the foregoing description. The scope of the present invention should therefore be determined with reference to the appended claims, along with the full scope of equivalents to which such claims are entitled.

What is claimed is:

1. A computer-implemented method for automated generation and utilization of reusable user interface event handling routines, the method comprising:
    defining, using a computer system, a business domain object from a line of business;
    associating, using the computer system, the business domain object with a user interface component type;
    generating an interface to allow definition of a rule for a user interface component type;
    defining, using the computer system, the rule for an event of the user interface component type based on the associated business domain object;
    automatically generating, using the computer system, an event handling routine based on the rule for the event of the user interface component type, the event handling routine providing the defined rule in a specific programming language;
    associating, using the computer system, the generated event handling routine with a user interface component of an application interface;
    utilizing the generated event handling routine by execution when an event associated with the user interface component is detected in the application interface;
    modifying, using the computer system, the defined rule to create an updated rule; and
    generating, using the computer system, an updated event handling routine to provide the updated rule in place of the defined rule and to replace the previously generated event handling routine.

2. The method of claim 1, wherein generating the interface comprises receiving a graphical representation of a user interface containing enhanced user interface controls associated with the business domain object and analyzing the graphical representation of the user interface and associations between the enhanced controls and the business domain object to generate the interface to allow definition of the rule.

3. The method of claim 1, further comprising providing, using the computing system, a definition interface to allow a rule for an event of the user interface component type to be defined based on the associated business domain object.

4. The method of claim 3, wherein the definition interface is provided in a spreadsheet format.

5. The method of claim 1, further comprising:
    generating, using the computer system, an event handling routine providing the defined rule in a different programming language.

6. A computer system for facilitating automated generation and utilization of reusable user interface event handling routines, the system comprising:
    a memory; and
    a processing device communicatively coupled to said memory, said processing device configured to:
    define a business domain object from a line of business;
    associate the business domain object with a user interface component type;
    generate an interface to allow definition of a rule for a user interface component type;
    define the rule for an event of the user interface component type based on the associated business domain object;
    automatically generate an event handling routine based on the rule for the event of the user interface component type, the event handling routine providing the defined rule in a specific programming language;
associate the generated event handling routine with a user interface component of an application interface; and
utilize the generated event handling routine by execution when an event associated with the user interface component is detected in the application interface;
define a rule for an event of the user interface component type based on the associated business domain object;
automatically generate an event handling routine based on the rule for the event of the user interface component type, the event handling routine providing the defined rule in a first programming language;
associate the generated event handling routine with a user interface component of an application interface;
modify the defined rule to create an updated rule; and
generate an updated event handling routine to provide the updated rule in place of the defined rule and to replace the previously generated event handling routine.

7. The computer system of claim 6, wherein generating the interface comprises receiving a graphical representation of a user interface containing enhanced user interface controls associated with the business domain object and analyzing the graphical representation of the user interface and associations between the enhanced controls and the business domain object to generate the interface to allow definition of the rule.

8. The computer system of claim 6, wherein the processing device is further configured to:
provide a definition interface to allow a rule for an event of the user interface component type to be defined based on the associated business domain object.

9. The computer system of claim 8, wherein the definition interface is provided in a spreadsheet format.

10. The computer system of claim 6, wherein the processing device is further configured to:
generate an event handling routine providing the defined rule in a different programming language.

11. A non-transitory computer-readable storage medium programmed to include instructions that, when executed by a processing device, cause the processing device to perform a method for automated generation and utilization of reusable user interface event handling routines, said method comprising:
defining a business domain object from a line of business;
associating the business domain object with a user interface component type;
generating an interface to allow definition of a rule for a user interface component type;
defining the rule for an event of the user interface component type based on the associated business domain object;
automatically generating an event handling routine based on the rule for the event of the user interface component type, the event handling routine providing the defined rule in a specific programming language;
associating the generated event handling routine with a user interface component of an application interface;
utilizing the generated event handling routine by execution when an event associated with the user interface component is detected in the application interface;
modifying the defined rule to create an updated rule; and
generating an updated event handling routine to provide the updated rule in place of the defined rule and to replace the previously generated event handling routine.

12. The computer readable medium of claim 11, wherein generating the interface comprises receiving a graphical representation of a user interface containing enhanced user interface controls associated with the business domain object and analyzing the graphical representation of the user interface and associations between the enhanced controls and the business domain object to generate the interface to allow definition of the rule.

13. The computer readable medium of claim 11, further comprising:
providing a definition interface to allow a rule for an event of the user interface component type to be defined based on the associated business domain object.

14. The computer readable medium of claim 11, wherein the interface is provided in a spreadsheet format.

15. The computer readable medium of claim 11, further comprising:
generating an event handling routine providing the defined rule in a different programming language.

* * * * *